(12) United States Patent
Ackley et al.

(10) Patent No.: US 11,852,156 B1
(45) Date of Patent: Dec. 26, 2023

(54) HVAC BLOWER WHEEL INSERT

(71) Applicant: Air International (US) Inc., Auburn Hills, MI (US)

(72) Inventors: Matthew Ackley, Harrison Township, MI (US); Joseph J. Spryshak, Hartland, MI (US)

(73) Assignee: Air International (US) Inc., Auburn Hills, MI (US)

( * ) Notice: Subject to any disclaimer, the term of this patent is extended or adjusted under 35 U.S.C. 154(b) by 0 days.

(21) Appl. No.: 17/985,447

(22) Filed: Nov. 11, 2022

(51) Int. Cl.
| | |
|---|---|
| *F04D 29/28* | (2006.01) |
| *F04D 29/053* | (2006.01) |
| *F04D 29/38* | (2006.01) |
| *B60H 1/00* | (2006.01) |

(52) U.S. Cl.
CPC ....... *F04D 29/281* (2013.01); *B60H 1/00471* (2013.01); *F04D 29/053* (2013.01); *F04D 29/388* (2013.01)

(58) Field of Classification Search
CPC ..... F04D 29/281; F04D 29/263; F04D 29/053
See application file for complete search history.

(56) References Cited

U.S. PATENT DOCUMENTS

| | | | | |
|---|---|---|---|---|
| 4,752,194 | A * | 6/1988 | Wienen | F04D 13/025 417/423.12 |
| 8,248,018 | B2 * | 8/2012 | Maekawa | H02K 21/04 318/400.29 |
| 8,487,490 | B2 * | 7/2013 | Dutau | H02K 9/14 310/59 |
| 9,732,802 | B2 * | 8/2017 | Griffiths | F04D 29/263 |
| 2013/0136635 | A1 * | 5/2013 | Nakamura | H02K 5/08 310/43 |
| 2019/0085857 | A1 * | 3/2019 | Pan | F04D 25/08 |

* cited by examiner

*Primary Examiner* — Michael L Sehn
(74) *Attorney, Agent, or Firm* — Carlson, Gaskey & Olds, P.C.

(57) ABSTRACT

A blower assembly for an HVAC system includes a blower wheel, which includes a plurality of blades. A laminated insert is concentric with the blower wheel and radially inward of the plurality of blades. A shaft is coupled to the blower wheel through the laminated insert.

20 Claims, 10 Drawing Sheets

HVAC BLOWER WHEEL INSERT

BACKGROUND

Vehicles may have an HVAC (Heating, ventilation, and air conditioning) climate control system located within an instrument panel which provides conditioned air, such as by heating or cooling or dehumidifying, through various outlets to occupants in the vehicle cabin.

These HVAC systems may include centrifugal blowers. The blowers may generally include a blower wheel that rotates within a housing and is driven by an electric motor. The blower wheel has blades that draw air in axially along the blower wheel's axis of rotation and discharge air radially outwardly. Blowers may be used in a variety of applications, such as in heating and cooling systems, including in vehicle applications, such as to introduce indoor and/or outdoor air to the HVAC system, the air passing the air through the system and blowing conditioned air into the interior of the automobile.

SUMMARY

A blower assembly for an HVAC system according to an example of this disclosure includes a blower wheel, which includes a plurality of blades. A laminated insert is concentric with the blower wheel and radially inward of the plurality of blades. A shaft is coupled to the blower wheel through the laminated insert.

In a further example of the foregoing, the blower wheel includes plastic.

In a further example of any of the foregoing, the laminated insert includes a plurality of metal sheet layers.

In a further example of any of the foregoing, the blower wheel is overmolded onto the laminated insert.

In a further example of any of the foregoing, the blower assembly includes a laminated rotor coupled to the shaft.

In a further example of any of the foregoing, the laminated insert includes a first plurality of metal sheet layers, and the laminated rotor comprises a second plurality of metal sheet layers.

In a further example of any of the foregoing, the first plurality of metal sheet layers form an insert-shaft engagement portion directly coupled to the shaft. The second plurality of metal sheet layers form a rotor-shaft engagement portion directly coupled to the shaft, and the insert-shaft engagement portion and the rotor-shaft engagement portion have the same profile.

In a further example of any of the foregoing, the first plurality of metal sheet layers are identical to one another.

In a further example of any of the foregoing, each of the first plurality of metal sheet layers includes a ring body, which provides a central opening and for being positioned about an insert center axis. At least one inner protrusion extends radially inward from the ring body into the central opening.

In a further example of any of the foregoing, consecutive axially adjacent ones of each of the first plurality of metal sheet layers are rotated relative to one another, such that their corresponding inner protrusions are rotated at an angle about the insert center axis relative to one another.

In a further example of any of the foregoing, the angle is 60 degrees.

In a further example of any of the foregoing, at least one inner protrusion provides a concave arc radially inner surface contoured to abut the shaft.

In a further example of any of the foregoing, at least one outer protrusion extends radially outward from the ring body.

In a further example of any of the foregoing, axially adjacent ones of the outer protrusions of the first plurality of metal sheet layers are arranged helically along the outer diameter of the laminated insert.

In a further example of any of the foregoing, each of the second plurality of metal sheet layers include a rotor sheet ring body, which provides a rotor sheet central opening and for being positioned about a rotor center axis. At least one rotor sheet inner protrusion extends radially inward from the rotor sheet ring body into the rotor sheet central opening.

In a further example of any of the foregoing, at least one inner protrusion and at least one rotor sheet inner protrusion have the same contour.

In a further example of any of the foregoing, consecutive axially adjacent ones of each of the first plurality of metal sheet layers are rotated relative to one another according to a first rotational relationship, such that their corresponding inner protrusions are rotated at an angle about the insert center axis relative to one another. Consecutive axially adjacent ones of each of the second plurality of metal sheet layers are rotated relative to one another according to a second rotational relationship, such that their corresponding rotor sheet inner protrusions are rotated at an angle about the rotor center axis relative to one another and the first rotational relationship is the same as the second rotational relationship.

In a further example of any of the foregoing, the blower wheel is comprised of plastic and is overmolded onto the laminated insert.

In a further example of any of the foregoing, each of the first plurality of metal sheet layers include a central opening bound by a ring portion and at least one radially inner protrusion. Each of the second plurality of metal sheet layers includes a second central opening bound by a second ring portion and at least one second radially inner protrusion. The first central opening and the second central opening have the same radially outer contour. The central opening of each of the first plurality of metal sheet layers provides the insert-shaft engagement portion, and the second central opening of each of the second plurality of metal sheet layers provide the rotor-shaft engagement portion.

A method of manufacturing a blower assembly according to an example of this disclosure includes coupling a laminated rotor to a shaft overmolding a blower wheel over a laminated insert and coupling the laminated insert to the shaft.

These and other features may be best understood from the following specification and drawings, the following of which is a brief description.

DETAILED DESCRIPTION

This disclosure is related to HVAC systems, and more particularly to laminated inserts for blower wheels.

Figure 1:
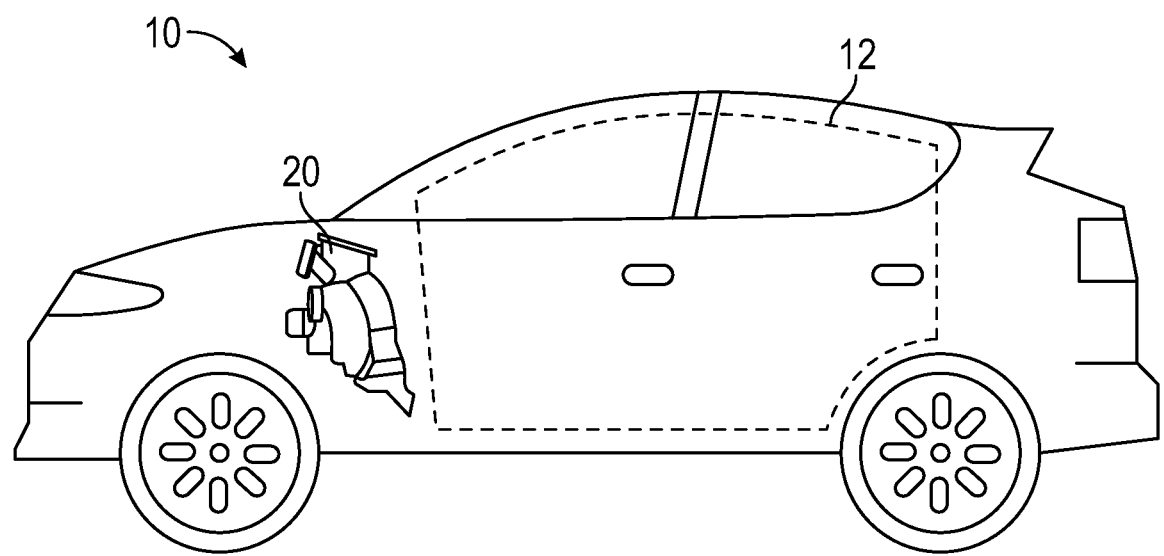
FIG. 1 schematically illustrates a vehicle with an example HVAC system.

FIG. 1 illustrates a vehicle 10 including an example HVAC system 20 for providing conditioned air to a vehicle cabin 12. In some examples, the vehicle 10 may include any of automobiles, heavy trucks, agricultural vehicles, or commercial vehicles.

Figure 2:
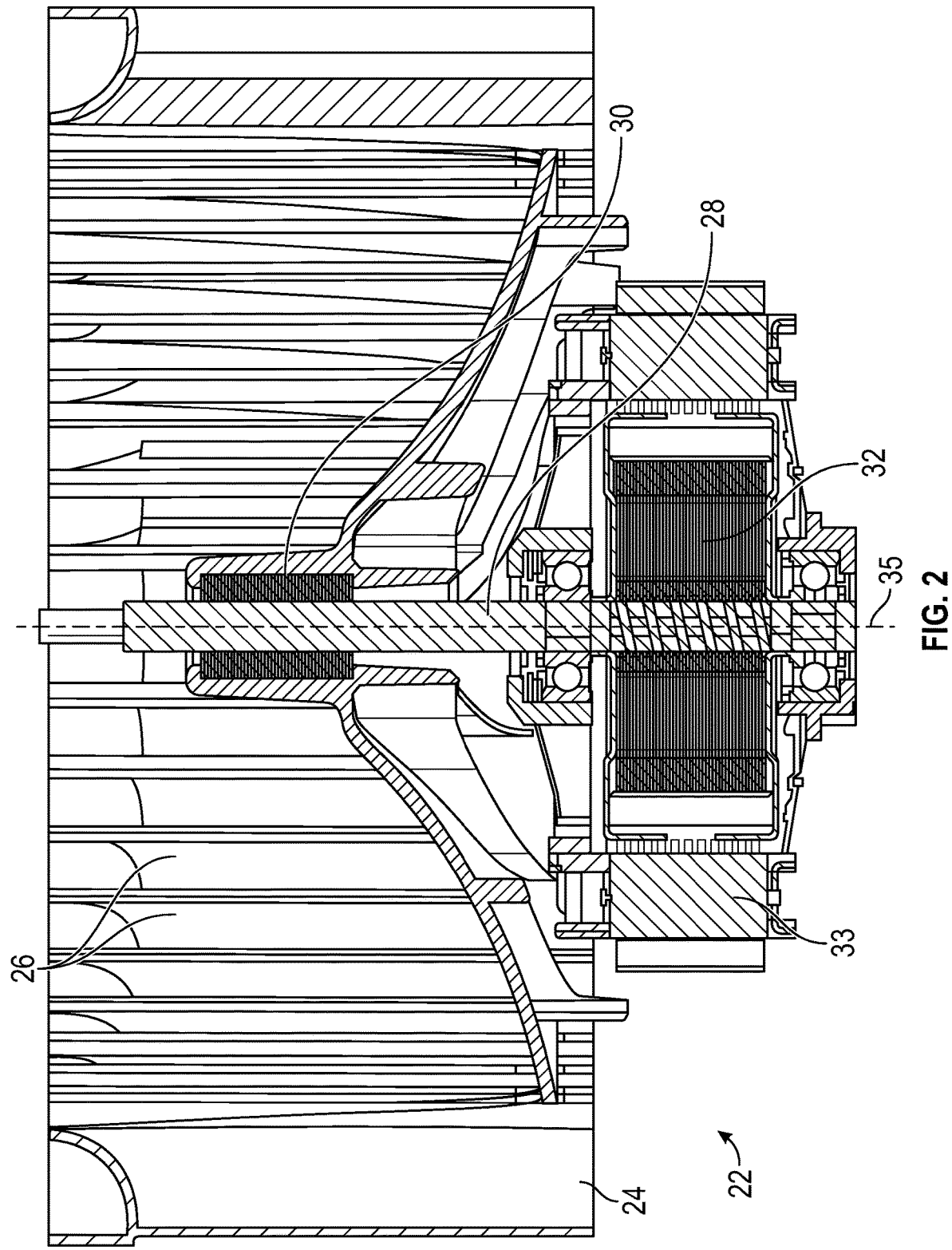
FIG. 2 illustrates an example blower assembly.

FIG. 2 illustrates a blower assembly 22, which may be used in the HVAC system 20 of FIG. 1, for example. The example blower assembly 22 includes a blower wheel 24 including a plurality of blades 26 that draw air in axially and discharge air radially outwardly. An evaporator and heater core (not shown) are positioned fluidly downstream of the blower assembly 22.

A shaft 28 is coupled to the blower wheel 24 through a laminated insert 30 concentric with the blower wheel 24 and radially inward of the plurality of blades 26. A laminated rotor 32 is coupled directly to the shaft 28 so that rotation of the shaft 28 causes rotation of the blower wheel 24, which in turn which causes air to flow from the inlet to the outlet. The example laminated insert 30 is also directly coupled to the shaft 28. A stator 33 is provided radially outward of the laminated rotor 32 for generating a rotating magnetic field and may also be laminated in some examples. The shaft 28 rotates about an axis 35 and the blower wheel 24, rotor 32, laminated insert 30, and stator 33 are each centered on the axis 35. In the example shown, the laminated rotor 32 is an inner rotor design, but other configurations, including outer rotor designs, may benefit from this disclosure.

Figure 3A:
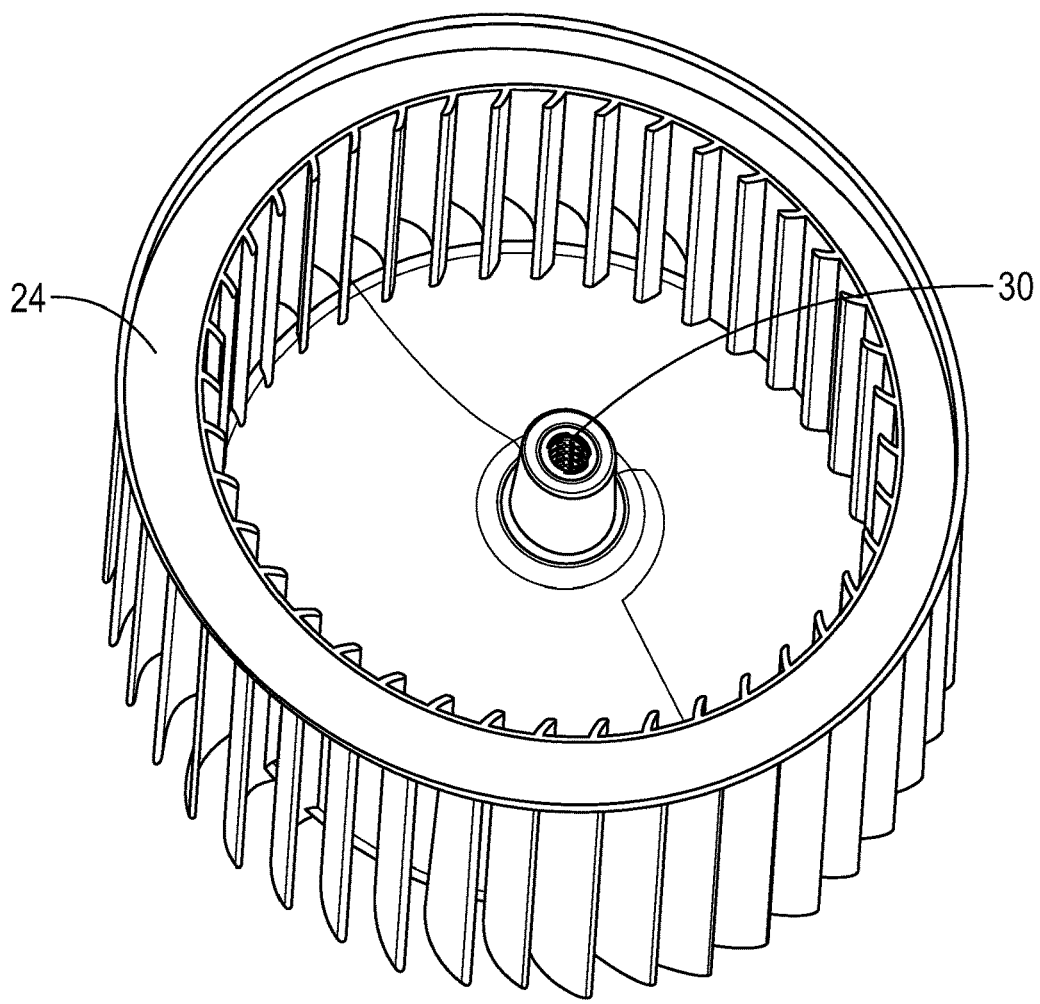
FIG. 3A illustrates the example blower assembly of FIG. 2 and an example laminated insert.
Figure 3B:
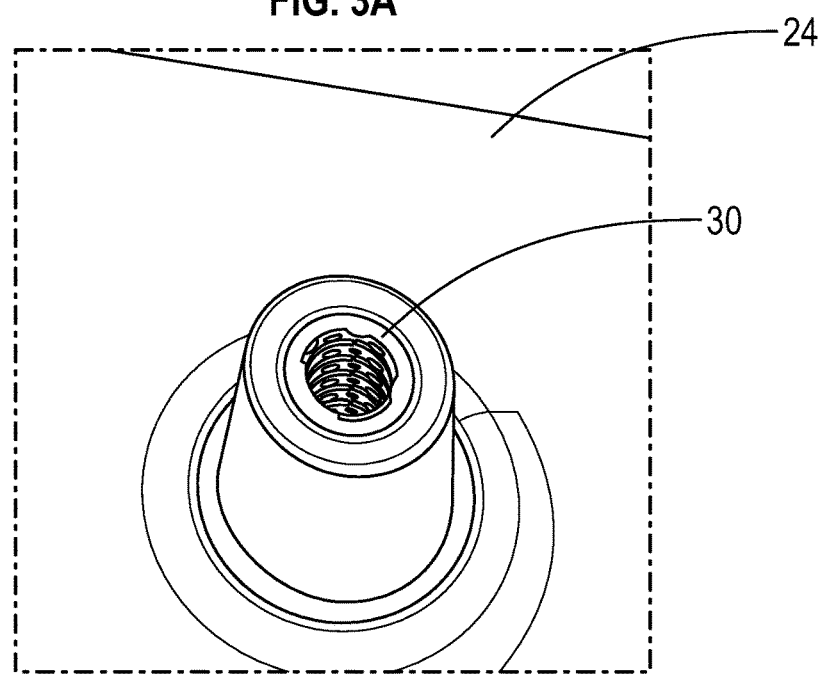
FIG. 3B illustrates the example blower assembly and laminated insert of FIGS. 2 and 3A.

FIGS. 3A and 3B illustrate the example blower wheel 24 and laminated insert 30. In some examples, as shown, the blower wheel 24 is plastic and is overmolded onto the laminated insert 30. As shown, in some examples, the blower wheel 24 is overmolded onto a radially outer portion of the laminated insert 30, while a radially inner portion of the laminated insert 30 is left exposed to engage the shaft 28 (not shown).

Figure 4:
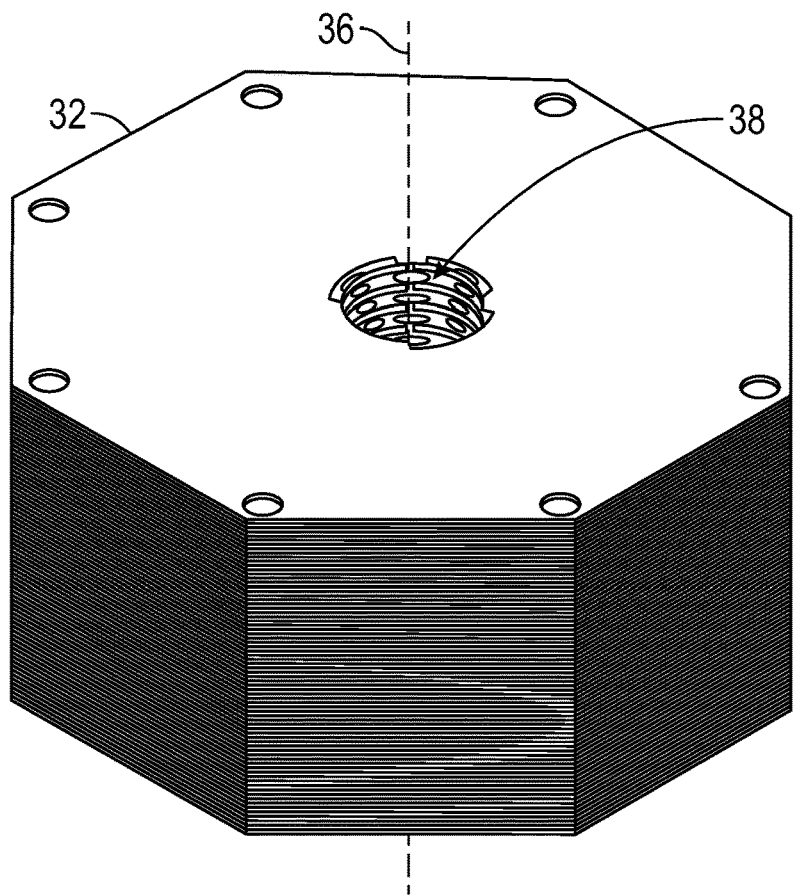
FIG. 4 illustrates an example laminated rotor.

As illustrated in FIG. 4, the example laminated rotor 32 includes a plurality of metal sheet layers 34, consisting of thin lamination sheets stacked together. These sheet layers 34 can be stacked loose, welded, or bonded together in some examples. These metal sheet layers 34 may be used instead of a solid piece to reduce eddy current losses in the rotor or stator in some examples. The sheet layers 34 provide an open central portion positioned about the rotor center axis 36 that provides a shaft engagement portion directly coupled to the shaft 28 (not shown; see FIG. 2). The example rotor center axis 36 is aligned with the axis 35 shown in FIG. 2.

Figure 5:
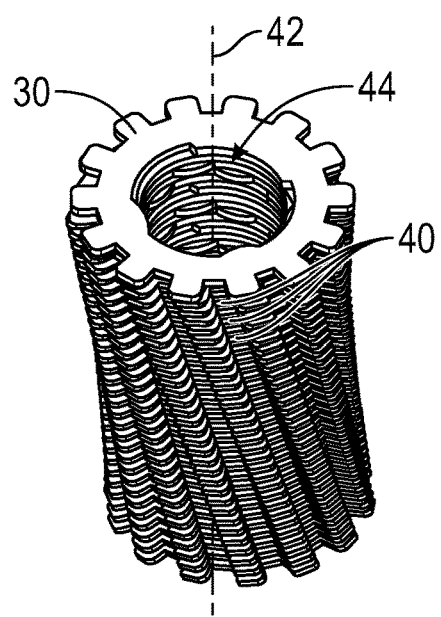
FIG. 5 illustrates the example laminated insert.

As illustrated in FIG. 5, the example laminated insert 30 similarly includes a plurality of metal sheet layers 40 consisting of thin lamination sheets stacked together. The metal sheet layers 40 are layered on top of one another in an axial direction relative to insert center axis 42. The sheet layers 40 provide an open central portion positioned about the insert center axis 42 that provides a shaft engagement portion 44 directly coupled to the shaft 28 (not shown). The example insert center axis 42 is aligned with the axis 35 shown in FIG. 2. The example shaft engagement portion 44 and shaft engagement portion 38 have the same profile so as to provide predictability in loading the blower wheel 24 onto the shaft 28. Applicant has identified the problem with prior art systems in that the plastic blower wheel may be too loose or too tight when loaded onto the shaft. If too loose, the blower wheel slips relative to the shaft, leading to inefficiency and/or failure. If too tight, the blower wheel can crack when loaded. The blower wheel can crack on install or the force may be too high that, after thermal cycles or mechanical shock, the blower wheel can fail in the field. The example inserts allow the joint to be more stable across temperature conditions. Further, in some examples, a metal-metal joint is more repeatable than a plastic-metal joint.

In some examples, each metal sheet layer 40 may have the same axial thickness as each metal sheet layer 34. In some examples, a metal sheet layer 40 and a corresponding metal sheet layer 34 may come from the same stamping sheet.

Figure 6:
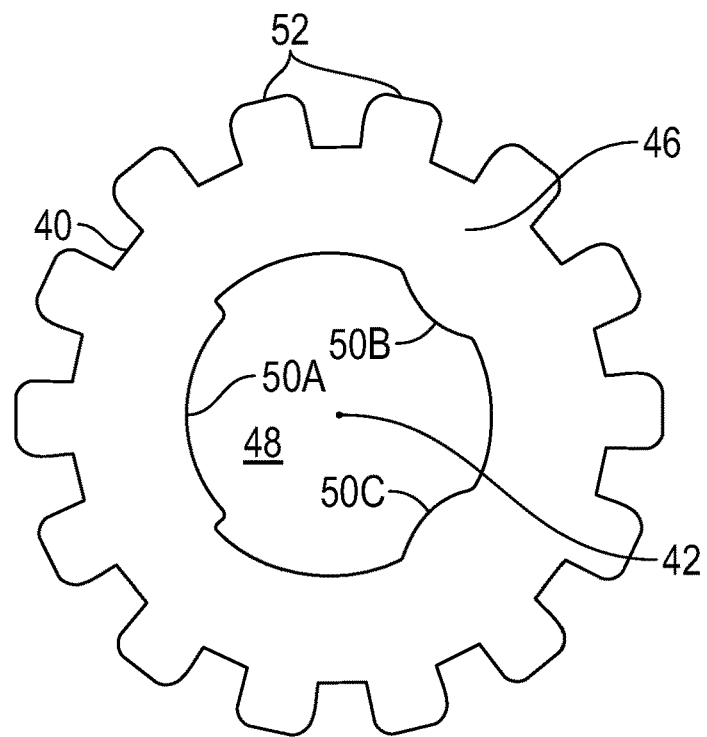
FIG. 6 illustrates an example metal sheet layer of the example laminated insert.

FIG. 6 illustrates an example metal sheet layer 40. In some examples, the plurality of metal sheet layers 40 are identical to one another. The example metal sheet layer 40 includes a ring body 46 positioned about insert center axis 42. Inner protrusions 50A, 50B, 50C extend radially inward from the ring body 46. The protrusions 50A, 50B, 50C and adjacent portions of the inner diameter of the ring portion bound a central opening 48. The example inner protrusions 50A, 50B, 50C are circumferentially spaced from one another about the ring body 46 and are configured for direct contact with the shaft 28 (not shown). The example inner protrusion 50A provides a concave arc radially inner surface having a contour that matches the radially outer contour of the shaft 28 (not shown). The example inner protrusions 50B and 50C provide convex radially inner surface for engaging the shaft 28 (not shown). Although three inner protrusions are shown, more or fewer may be utilized in some examples. Although exemplary protrusion contours are shown, other contours may be utilized in some examples.

A plurality of circumferentially spaced outer protrusions 52 extend radially outward from the ring body 46. Referring back to FIG. 5, in some examples, as shown, axially adjacent outer protrusions 52 are arranged helically along the outer diameter of the example laminated insert 30. In some examples, the helical pattern provides strong plastic engagement with the insert 30.

Figure 7:
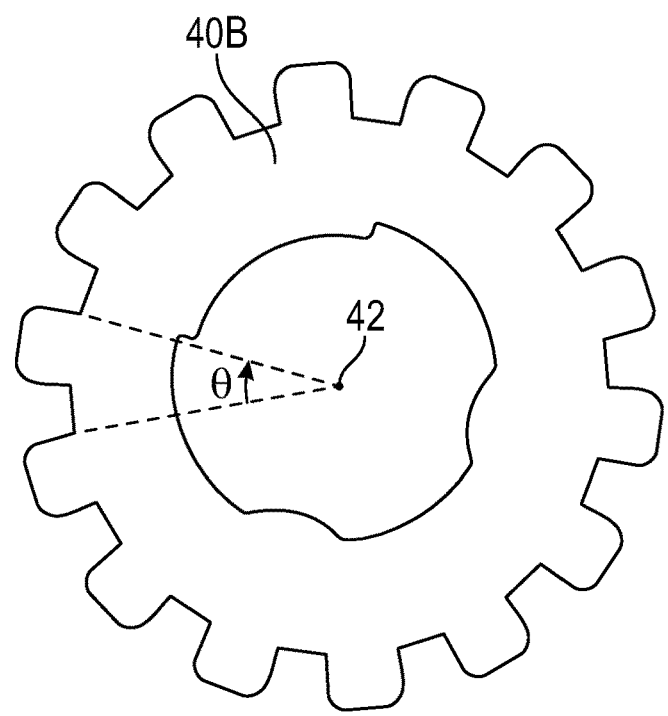
FIG. 7 illustrates another example metal sheet layer of the example laminated insert rotated relative to the metal sheet layer of FIG. 6.

In some examples, consecutive axially adjacent ones of each of the plurality of metal sheet layers 40 are rotated relative to one another, such that their corresponding inner protrusions 50A, 50B, 50C are rotated at an angle about the insert center axis 42 relative to one another. In some examples, this may be done to match the same relationship between axially adjacent rotor sheet layers 34. FIG. 7 illustrates an example metal sheet layer 40B to be positioned above the metal sheet layer 40 shown in FIG. 6. The sheet layers 40 and 40B are identical. As shown, the metal sheet layer 40B is rotated clockwise an angle Θ of 60 degrees about the insert center axis 42 relative to the metal sheet layer 40 shown in FIG. 6. Another identical sheet layer may then be positioned above the metal sheet layer 40B and rotated clockwise 60 degrees about the insert center axis 42 relative to the metal sheet layer 40B, and so on for consecutive layers, forming the example laminated insert 30. Other angles Θ of rotation may be utilized in some examples.

Figure 8:
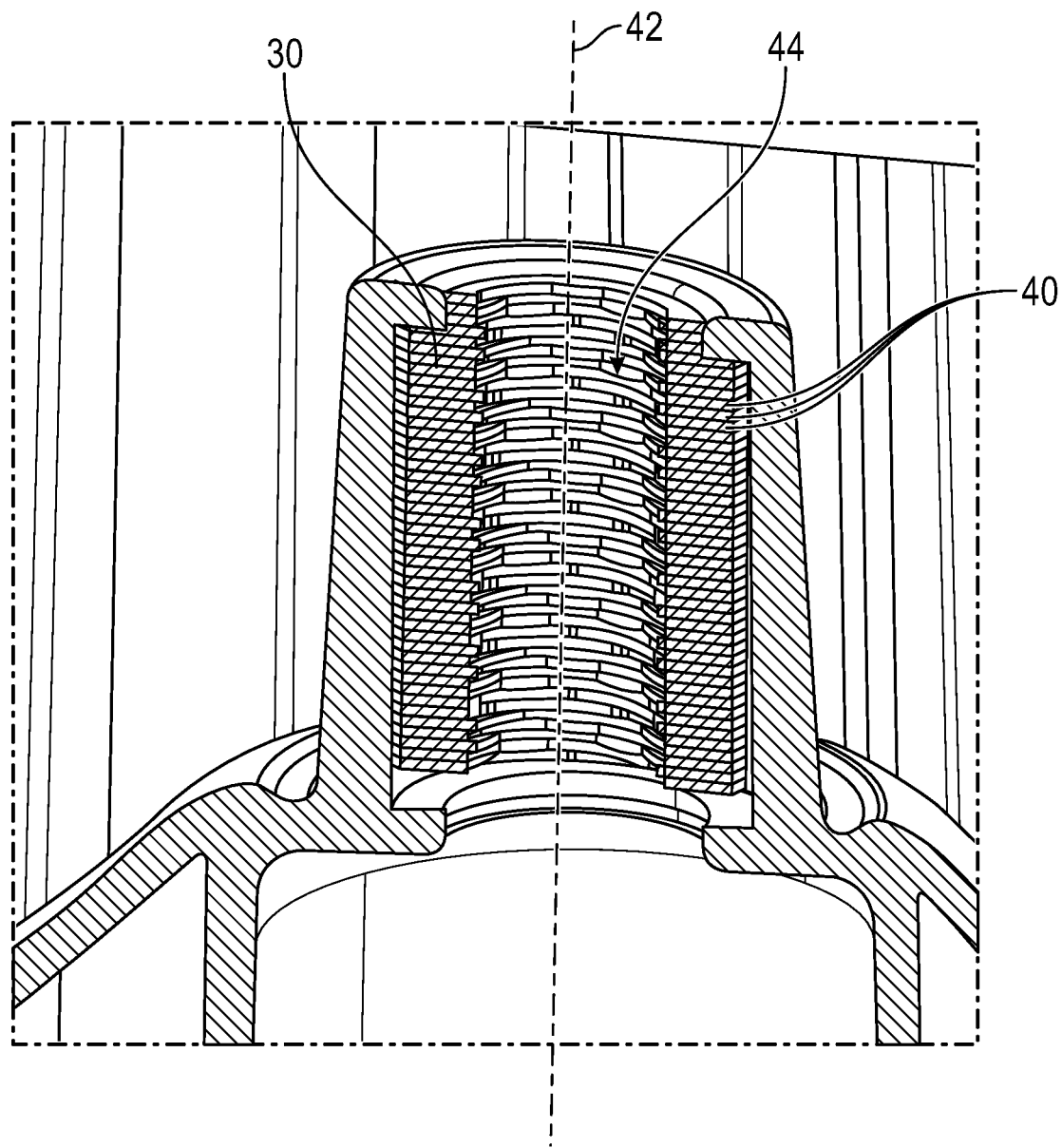
FIG. 8 illustrates a sectional view of the example laminated insert.

FIG. 8 illustrates a sectional view inside the shaft engagement portion 44, in which, consecutive axially adjacent ones of each of the plurality of metal sheet layers 40 are rotated relative to one another, such that their corresponding inner protrusions 50A, 50B, 50C are rotated at an angle about the insert center axis 42 relative to one another.

Figure 9:
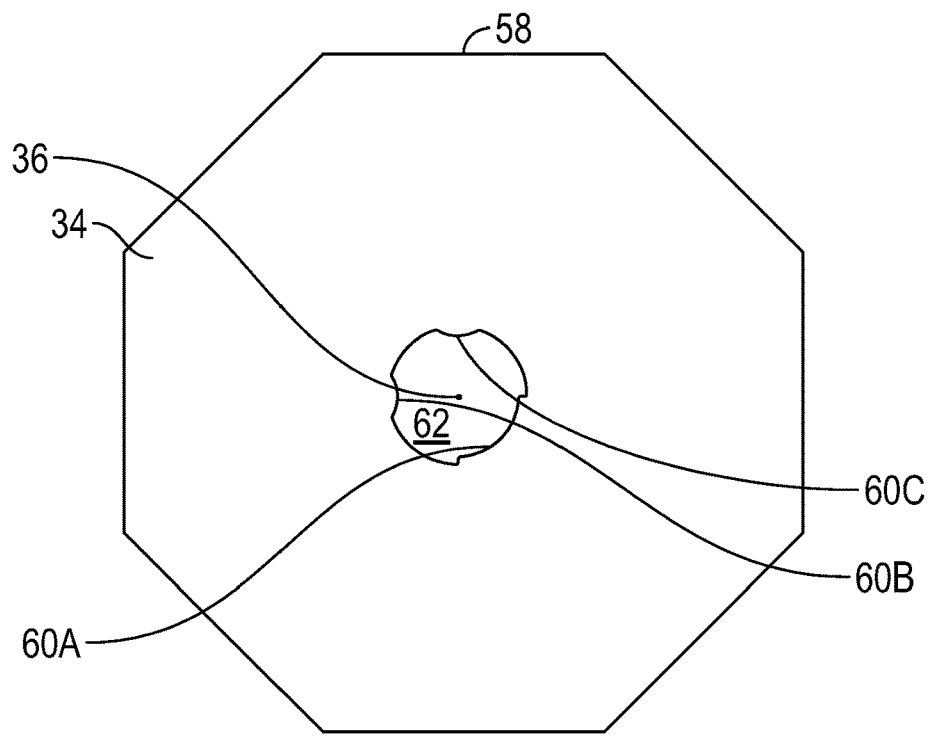
FIG. 9 illustrates an example metal sheet layer of the example laminated rotor.

FIG. 9 illustrates an example metal sheet layer 34. In some examples, the plurality of metal sheet layers 34 are identical to one another. The example metal sheet layer 34 includes an inner ring body 54 positioned about rotor center axis 36. A plurality of spokes (not shown) may extend radially outward from an inner ring body to an outer ring body 58. Inner protrusions 60A, 60B, 60C extend radially inward from the inner ring body 54 and are configured for direct contact with the shaft 28 (not shown). The protrusions 60A, 60B, 60C and adjacent portions of the inner diameter of the inner ring body 54 bound a central opening 62. The example inner protrusions 60A, 60B, 60C are circumferentially spaced from one another about the inner ring body 54. The example inner protrusions 60A, 60B, 60C are have the same contour as the example inner protrusions 50A, 50B, 50C. Although three inner protrusions 60A, 60B, 60C are shown, more or fewer may be utilized in some examples. Although exemplary protrusion contours are shown, other contours may be utilized in some examples.

Figure 10:
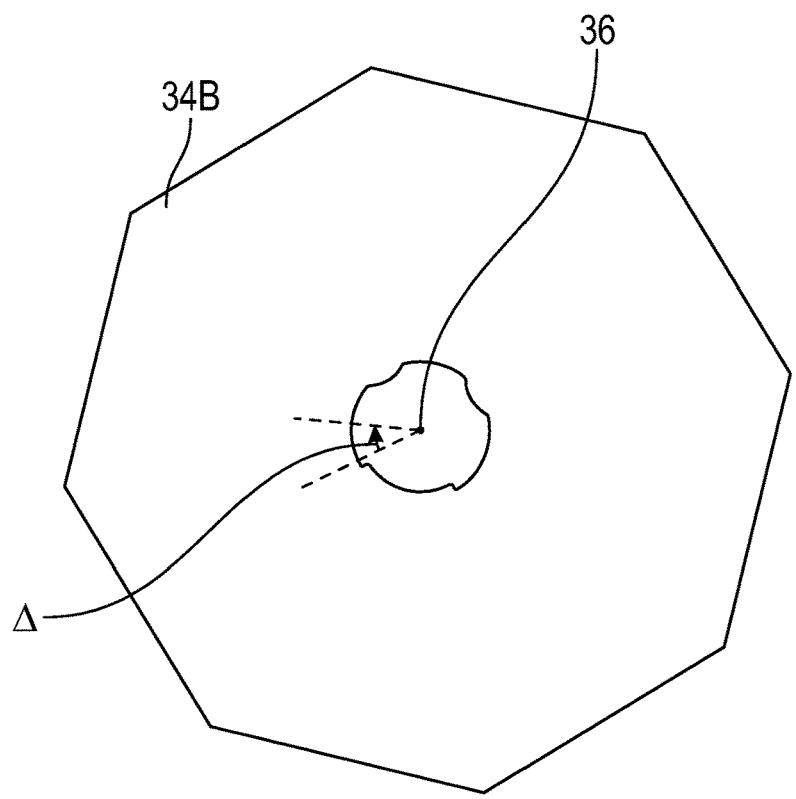
FIG. 10 illustrates another example metal sheet layer of the example laminated rotor rotated relative to the example metal sheet layer of FIG. 9.

In some examples, consecutive axially adjacent ones of each of the plurality of metal sheet layers 34 are rotated relative to one another, such that their corresponding inner protrusions 60A, 60B, 60C are rotated at an angle about the insert center axis 42 relative to one another. In some examples, this may be done to match the same relationship between axially adjacent rotor sheet layers 40, such that the respective engagement portions 38, 44 have the same profiles. FIG. 10 illustrates an example metal sheet layer 34B to be positioned above the metal sheet layer 34 shown in FIG. 9. The sheet layers 40 and 40B are identical. As shown, the metal sheet layer 34B is rotated clockwise an angle Δ 60 degrees about the center axis 36 relative to the metal sheet layer 34 shown in FIG. 9. Another identical sheet layer may then be positioned above the metal sheet layer 34B and rotated clockwise the angle Δ 60 degrees about the center axis 36 relative to the metal sheet layer 34B, and so on for consecutive layers, forming the laminated rotor 32. That is, referring additionally to FIG. 7, the angle Θ and the angle Δ are the same such that engagement portion 38 has the same profile as the example shaft engagement portion 44. Other angles A of rotation may be utilized in some examples. In some examples, other angles A are utilized, so long as the angle Θ and the angle Δ are the same.

Figure 11:
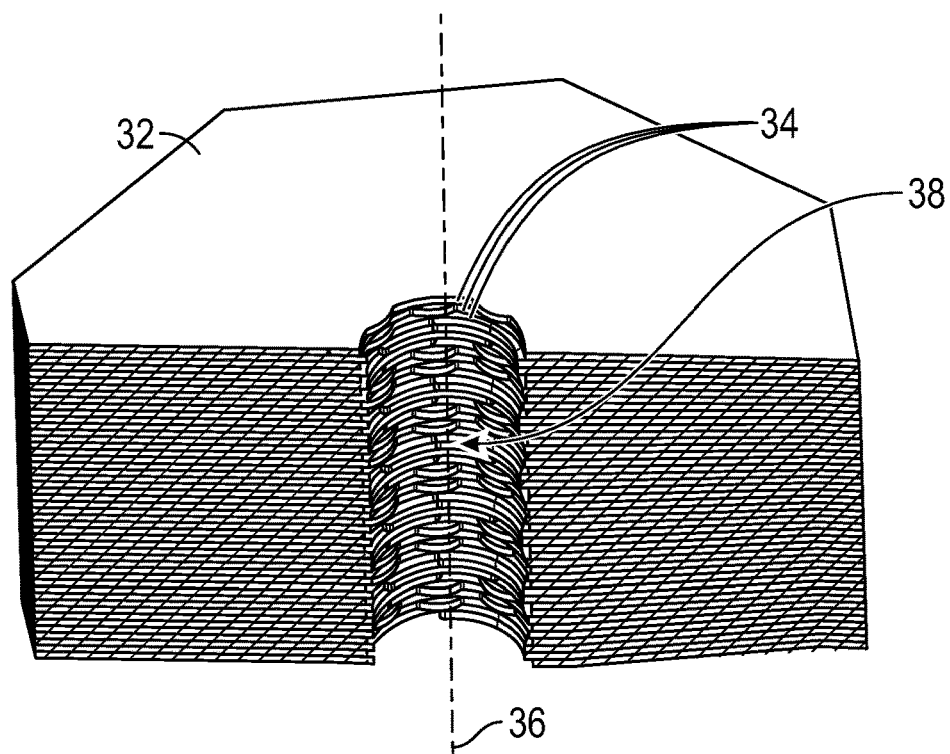
FIG. 11 illustrates a sectional view of the example laminated rotor.
Figure 12:
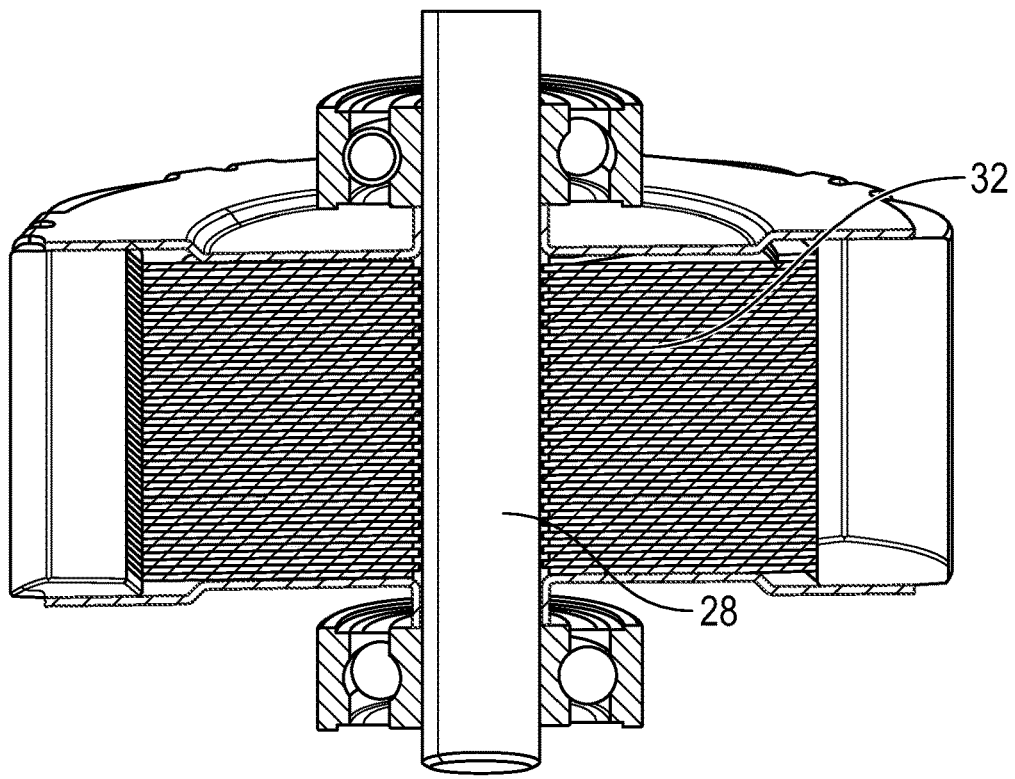
FIG. 12 illustrates a cross-sectional view of the example laminated rotor engaging the example shaft.
Figure 13:
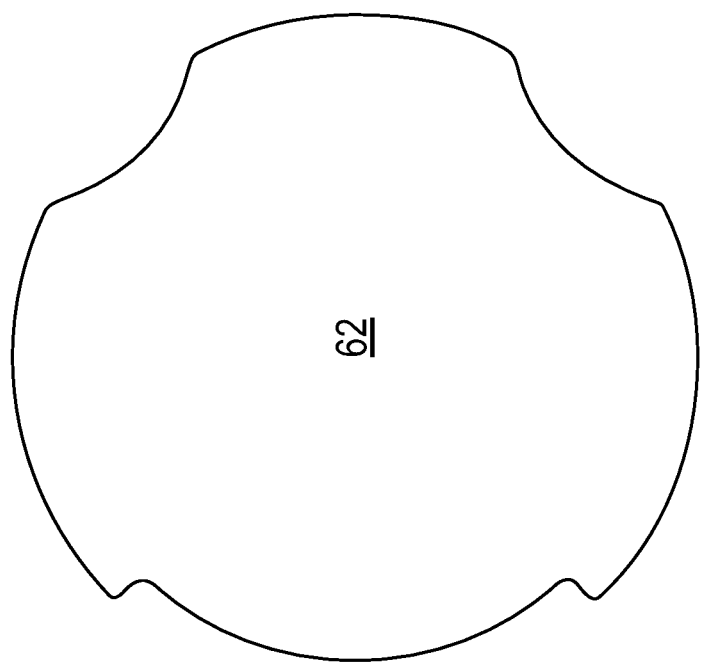
FIG. 13 schematically illustrates the contours of the central openings of the laminated rotor metal sheet layer and the laminated insert metal sheet layer.
Figure 13:
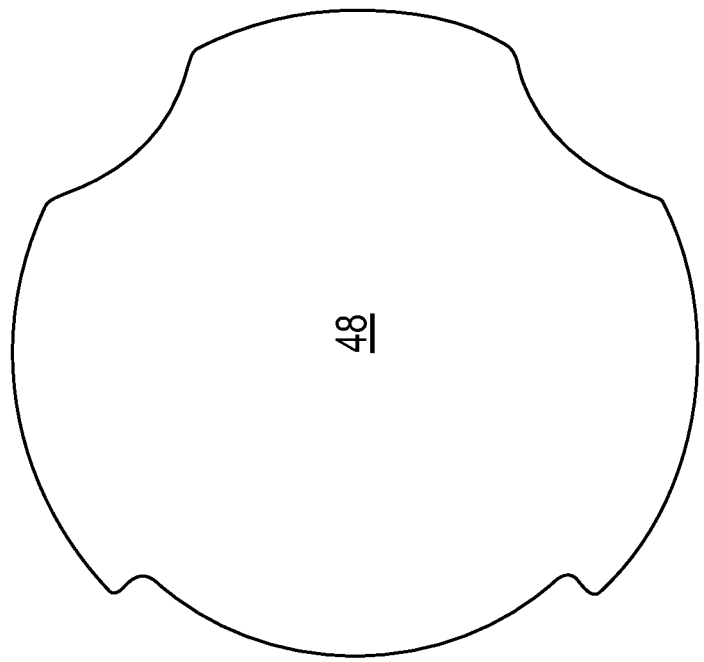

FIG. 11 illustrates a sectional view inside the shaft engagement portion 38 of the example laminated rotor 32. Consecutive axially adjacent ones of each of the plurality of metal sheet layers 34 are rotated relative to one another, such that their corresponding inner protrusions 60A, 60B, 60C are rotated at an angle about the rotor center axis 36 relative to one another. As shown, the example shaft engagement portion 38 has the same profile as the example shaft engagement portion 44 (FIG. 8) so as to provide predictability in loading the blower wheel 24 onto the shaft 28. Other configurations are contemplated in which the shaft engagement portion 38 has the same profile as the shaft engagement portion 44. In some examples, the laminated insert 30 and the laminated rotor 32 have the same number of metal sheet layers. In some examples, the laminated insert 30 has fewer metal sheet layers than the laminated rotor 32. FIG. 12 illustrates a cross sectional view of the example laminated rotor 32 loaded onto the shaft 28. As illustrated schematically in FIG. 13, the central opening 48 and the central opening 62 have the same radially outer contours.

Figure 14:
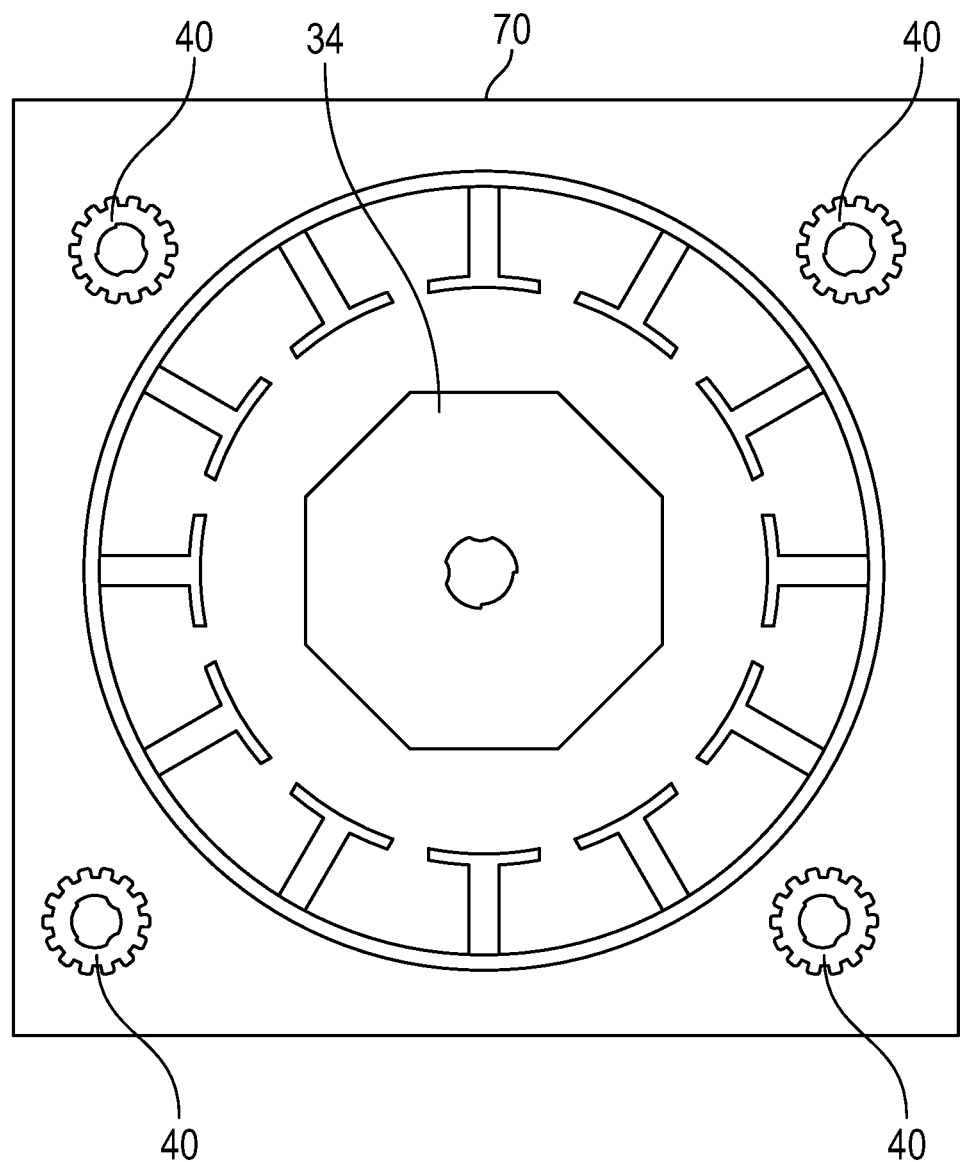
FIG. 14 illustrates an example stamping sheet.

FIG. 14 illustrates an example stamping sheet 70 including a metal sheet layer 34 and one or more metal sheet layers 40. The same stamping sheet 70 may also be used to make a metal sheet layer for an associated stator. In doing so, layers of the same thickness may be provided and material may be conserved.

A method of manufacturing a blower assembly, such as one of the example blower assemblies disclosed herein, may include coupling a laminated rotor to a shaft, overmolding a blower wheel over a laminated insert; and coupling the laminated insert to the shaft. Axially consecutive ones of a plurality of sheet layers that form the laminated rotor may be rotated relative to one another. Axially consecutive ones of a plurality of sheet layers that form the laminated insert may be rotated relative to one another in the same fashion.

Although the different examples are illustrated as having specific components, the examples of this disclosure are not limited to those particular combinations. It is possible to use some of the components or features from any of the embodiments in combination with features or components from any of the other embodiments.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A blower assembly for an HVAC system comprising:
a blower wheel including a plurality of blades;
a laminated insert concentric with the blower wheel and radially inward of the plurality of blades and comprising a plurality of metal sheet layers; and
a shaft coupled to the blower wheel through the laminated insert, wherein each of the plurality of metal sheet layers includes at least one surface that engages the shaft.

2. The blower assembly as recited in claim 1, wherein the blower wheel comprises plastic and is overmolded onto the laminated insert.

3. The blower assembly as recited in claim 1, further comprising:
a laminated rotor coupled to the shaft and comprising a second plurality of metal sheet layers.

4. The blower assembly of claim 1, wherein the plurality of metal sheet layers are identical to one another.

5. The blower assembly of claim 1, wherein each of the plurality of metal sheet layers includes a ring body providing a central opening and for being positioned about an insert center axis, and at least one inner protrusion extending radially inward from the ring body into the central opening, the at least one inner protrusion providing the at least one surface that engages the shaft.

6. The blower assembly as recited in claim 5, wherein consecutive axially adjacent ones of each of the plurality of metal sheet layers are rotated relative to one another, such that their corresponding inner protrusions are rotated at an angle about the insert center axis relative to one another.

7. The blower assembly as recited in claim 1, comprising a laminated rotor coupled to the shaft and comprising a second plurality of metal sheet layers, wherein the plurality of metal sheet layers is a first plurality of metal sheet layers, the first plurality of metal sheet layers each have the same axial thickness, and each of the second plurality of metal sheet layers has the same axial thickness as the each of the first plurality of metal sheet layers.

8. A blower assembly for an HVAC system comprising:
a blower wheel including a plurality of blades;
a laminated insert concentric with the blower wheel and radially inward of the plurality of blades;
a shaft coupled to the blower wheel through the laminated insert; and
a laminated rotor coupled to the shaft;
wherein the laminated insert comprises a first plurality of metal sheet layers, and the laminated rotor comprises a second plurality of metal sheet layers,
the first plurality of metal sheet layers form an insert-shaft engagement portion directly coupled to the shaft, the second plurality of metal sheet layers form a rotor-shaft engagement portion directly coupled to the shaft, and the insert-shaft engagement portion and the rotor-shaft engagement portion have the same profile.

9. The blower assembly as recited in claim 8, wherein each of the first plurality of metal sheet layers includes a central opening bound by a ring portion and at least one radially inner protrusion, each of the second plurality of metal sheet layers includes a second central opening bound by a second ring portion and at least one second radially inner protrusion, and the first central opening and the second central opening have the same radially outer contour, the central opening of each of the first plurality of metal sheet layers provides the insert-shaft engagement portion, and the second central opening of each of the second plurality of metal sheet layers provides the rotor-shaft engagement portion.

10. A blower assembly for an HVAC system comprising:
a blower wheel including a plurality of blades;
a laminated insert concentric with the blower wheel and radially inward of the plurality of blades;
a shaft coupled to the blower wheel through the laminated insert; and
a laminated rotor coupled to the shaft;
wherein the laminated insert comprises a first plurality of metal sheet layers, and the laminated rotor comprises a second plurality of metal sheet layers,
and the first plurality of metal sheet layers are identical to one another.

11. The blower assembly as recited in claim 10, wherein each of the first plurality of metal sheet layers includes a ring body providing a central opening and for being positioned about an insert center axis, and at least one inner protrusion extending radially inward from the ring body into the central opening.

12. The blower assembly as recited in claim 11, wherein consecutive axially adjacent ones of each of the first plurality of metal sheet layers are rotated relative to one another, such that their corresponding inner protrusions are rotated at an angle about the insert center axis relative to one another.

13. The blower assembly as recited in claim 12, wherein the angle is 60 degrees.

14. The blower assembly as recited in claim 11, wherein the at least one inner protrusion provides a concave arc radially inner surface contoured to abut the shaft.

15. The blower assembly as recited in claim 11, wherein at least one outer protrusion extends radially outward from the ring body.

16. The blower assembly as recited in claim 15, wherein axially adjacent ones of the outer protrusions of the first plurality of metal sheet layers are arranged helically along the outer diameter of the laminated insert.

17. The blower assembly as recited in claim 11, wherein each of the second plurality of metal sheet layers includes a rotor sheet ring body providing a rotor sheet central opening and for being positioned about a rotor center axis, and at least one rotor sheet inner protrusion extending radially inward from the rotor sheet ring body into the rotor sheet central opening.

18. The blower assembly as recited in claim 17, wherein the at least one inner protrusion and the at least one rotor sheet inner protrusion have the same contour.

19. The blower assembly as recited in claim 18,
wherein consecutive axially adjacent ones of each of the first plurality of metal sheet layers are rotated relative to one another according to a first rotational relationship, such that their corresponding inner protrusions are rotated at an angle about the insert center axis relative to one another;
consecutive axially adjacent ones of each of the second plurality of metal sheet layers are rotated relative to one another according to a second rotational relationship, such that their corresponding rotor sheet inner protrusions are rotated at an angle about the rotor center axis relative to one another; and
the first rotational relationship is the same as the second rotational relationship.

20. The blower assembly as recited in claim 19, wherein the blower wheel comprises plastic and is overmolded onto the laminated insert.

* * * * *